US011571926B2

(12) United States Patent
Abke et al.

(10) Patent No.: US 11,571,926 B2
(45) Date of Patent: Feb. 7, 2023

(54) VEHICLE WITH ARTICULATED WHEEL

(71) Applicant: Honda Motor Co., Ltd., Tokyo (JP)

(72) Inventors: Timothy A. Abke, Dublin, OH (US); Skylar Sible, Dublin, OH (US); Megan Imwalle, Fort Loramie, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 651 days.

(21) Appl. No.: 16/560,095

(22) Filed: Sep. 4, 2019

(65) Prior Publication Data
US 2020/0156407 A1 May 21, 2020

Related U.S. Application Data

(60) Provisional application No. 62/769,940, filed on Nov. 20, 2018.

(51) Int. Cl.
B60B 19/04 (2006.01)
B60B 19/12 (2006.01)
B62D 53/02 (2006.01)

(52) U.S. Cl.
CPC .............. B60B 19/04 (2013.01); B60B 19/12 (2013.01); B62D 53/02 (2013.01)

(58) Field of Classification Search
CPC ......... B60B 19/04; B60B 19/12; B60B 19/02; B62D 53/02
See application file for complete search history.

(56) References Cited

U.S. PATENT DOCUMENTS

| 3,014,547 | A | * | 12/1961 | Van Der Lely | B60B 15/263 301/43 |
| 4,773,889 | A | * | 9/1988 | Rosenwinkel | A63H 17/262 301/41.1 |
| 5,487,692 | A | * | 1/1996 | Mowrer | A63H 17/262 446/448 |
| 5,839,795 | A | * | 11/1998 | Matsuda | B60B 19/04 301/5.1 |
| 6,502,657 | B2 | * | 1/2003 | Kerrebrock | B62D 57/00 446/454 |
| 6,648,722 | B2 | * | 11/2003 | Lynders | A63H 17/004 446/454 |
| 6,798,140 | B2 | | 9/2004 | Reim et al. | |
| 6,860,346 | B2 | | 3/2005 | Burt et al. | |
| 7,056,185 | B1 | * | 6/2006 | Anagnostou | B62D 61/00 180/218 |

(Continued)

FOREIGN PATENT DOCUMENTS

| CN | 205736636 | 11/2016 |
| CN | 107199837 | 9/2017 |
| WO | 2014192029 | 12/2014 |

Primary Examiner — Tony H Winner
Assistant Examiner — Michael R Stabley
(74) Attorney, Agent, or Firm — Rankin, Hill & Clark LLP

(57) ABSTRACT

A vehicle includes a frame including a front frame part and a rear frame part. An elongated single wheel is rotatably connected to one of the front frame part and the rear frame part. The elongated wheel houses an expansion device including a linkage mechanism adapted to reconfigure a shape of the elongated wheel between a cylindrical shape in top view of the vehicle when the vehicle is traveling in a straight direction and a frustoconical shape in top view of the vehicle in a turning condition of the vehicle.

20 Claims, 7 Drawing Sheets

(56) References Cited

U.S. PATENT DOCUMENTS

| | | | | |
|---|---|---|---|---|
| 7,448,421 | B2* | 11/2008 | Kahen | ............ B60B 15/18 |
| | | | | 152/216 |
| 8,197,298 | B2* | 6/2012 | Willett | ............ A63H 33/003 |
| | | | | 446/470 |
| 8,678,520 | B2* | 3/2014 | Sheu | ............ B60B 25/02 |
| | | | | 301/58 |
| 9,415,631 | B2 | 8/2016 | Lee et al. | |
| 10,390,517 | B2* | 8/2019 | Wilson | ............ A01K 15/021 |
| 10,864,959 | B2* | 12/2020 | Abke | ............ B62D 61/02 |
| 2007/0097698 | A1 | 5/2007 | Song et al. | |
| 2009/0098799 | A1* | 4/2009 | Leonov | ............ A63H 17/18 |
| | | | | 446/460 |
| 2015/0084398 | A1* | 3/2015 | Lee | ............ B60B 1/003 |
| | | | | 301/66 |

* cited by examiner

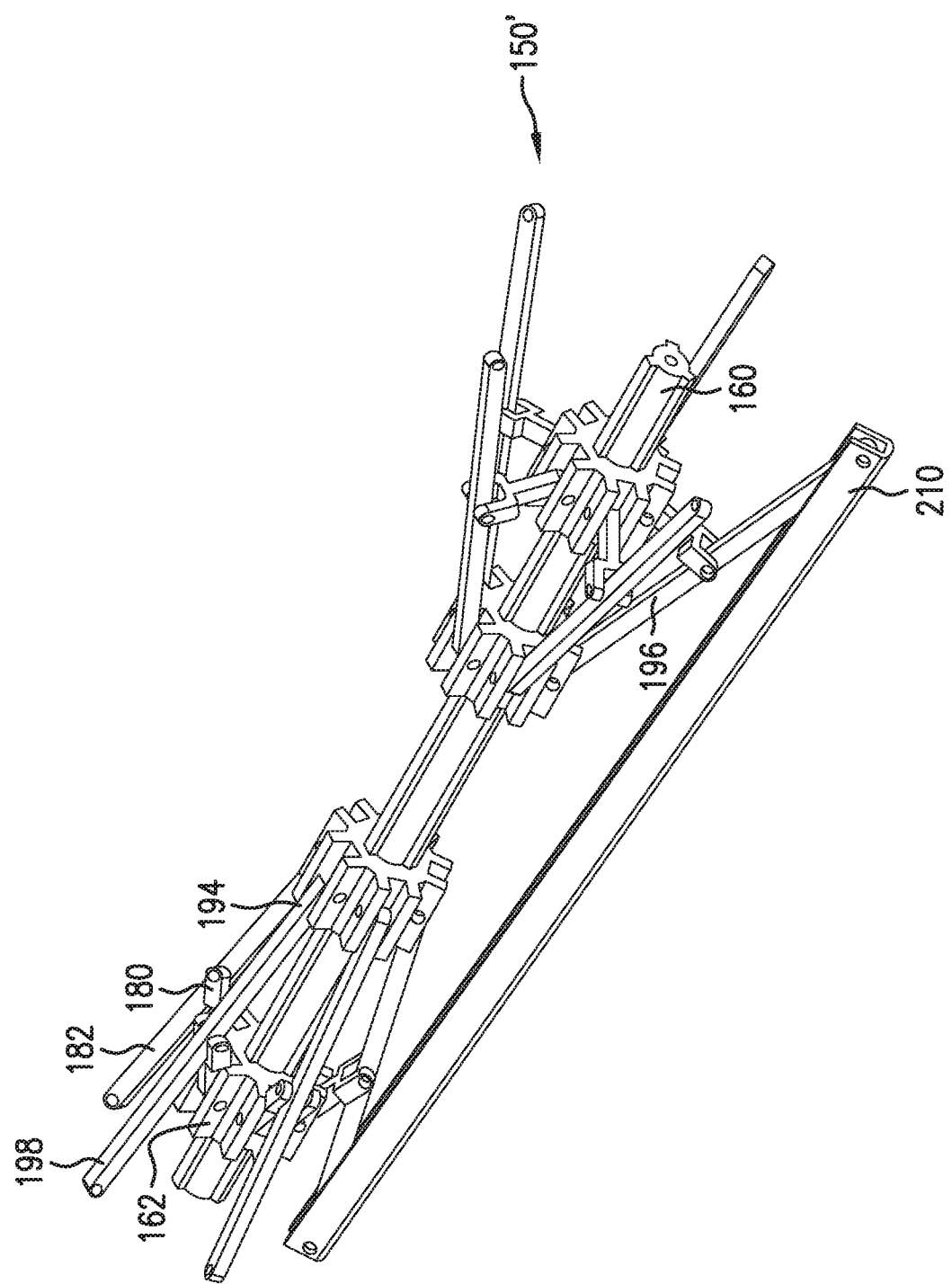

VEHICLE WITH ARTICULATED WHEEL

The present application claims priority to U.S. Prov. Patent App. Ser. No. 62/769,940, filed Nov. 20, 2018, the disclosure being incorporated herein by reference.

BACKGROUND

The subject matter disclosed herein relates to a vehicle with an articulated wheel, and more particularly, to a vehicle having a front wheel and a rear wheel, wherein at least one of the front wheel and rear wheel is configured to change its shape during a turning condition of the vehicle.

BRIEF DESCRIPTION

According to one aspect, a vehicle comprises a frame including a front frame part and a rear frame part. An elongated single wheel is rotatably connected to one of the front frame part and the rear frame part. The elongated wheel houses an expansion device including a linkage mechanism adapted to reconfigure a shape of the elongated wheel between a cylindrical shape in top view of the vehicle when the vehicle is traveling in a straight direction and a frustoconical shape in top view of the vehicle in a turning condition of the vehicle.

According to another aspect, a vehicle comprises a frame including a front frame part and a rear frame part. A single front wheel is rotatably connected to the front frame part, and a single rear wheel is rotatably connected to the rear frame part. Each of the front wheel and the rear wheel is adapted to have a cylindrical shape in top view when the vehicle is traveling in a straight direction. At least one of the front wheel and the rear wheel houses an expansion device including a linkage mechanism adapted to reconfigure the at least one of the front wheel and the rear wheel to a frustoconical shape in top view in a turning condition of the vehicle.

According to another aspect, a vehicle comprises a frame including a front frame part and a rear frame part. A single front wheel is rotatably connected to the front frame part, and a single rear wheel is rotatably connected to the rear frame part. Each of the front wheel and the rear wheel is adapted to have a cylindrical shape in top view when the vehicle is traveling in a straight direction, and is adapted to have a frustoconical shape in top view in a turning condition of the vehicle. The front wheel is configured to house a front expansion device including a front linkage mechanism adapted to selectively expand one of opposite end portions of the front wheel based on the turning direction of the vehicle. The rear wheel is configured to house a rear expansion device including a rear linkage mechanism adapted to selectively expand one of opposite end portions of the rear wheel based on the turning direction of the vehicle. Each of the front and rear linkage mechanisms includes links interconnecting an axle to the respective opposite end portions of the front and rear wheels

BRIEF DESCRIPTION OF THE DRAWINGS

FIG. 4 is a perspective view of an expansion mandrel according to another aspect of the present disclosure.

DETAILED DESCRIPTION

Figure 1:
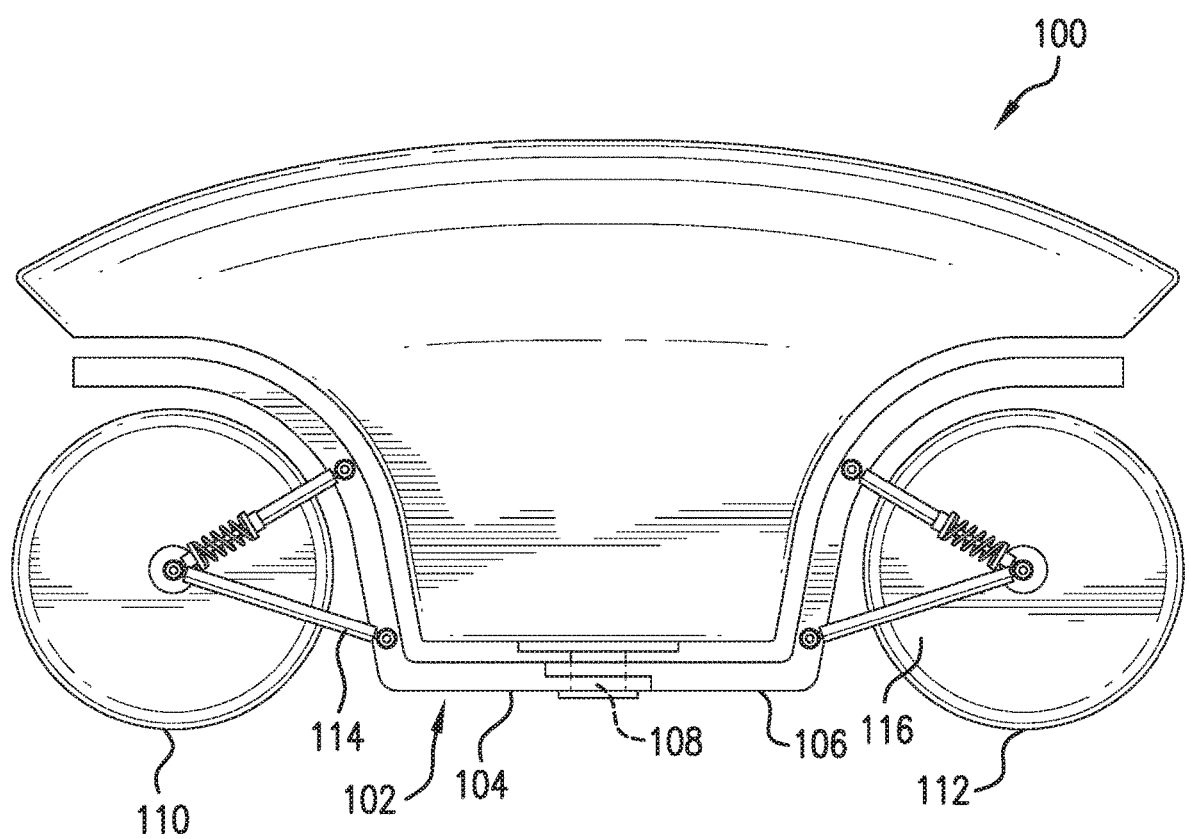
FIGS. 1 and 2 are schematic views of a vehicle according to one aspect of the present disclosure.
Figure 2:
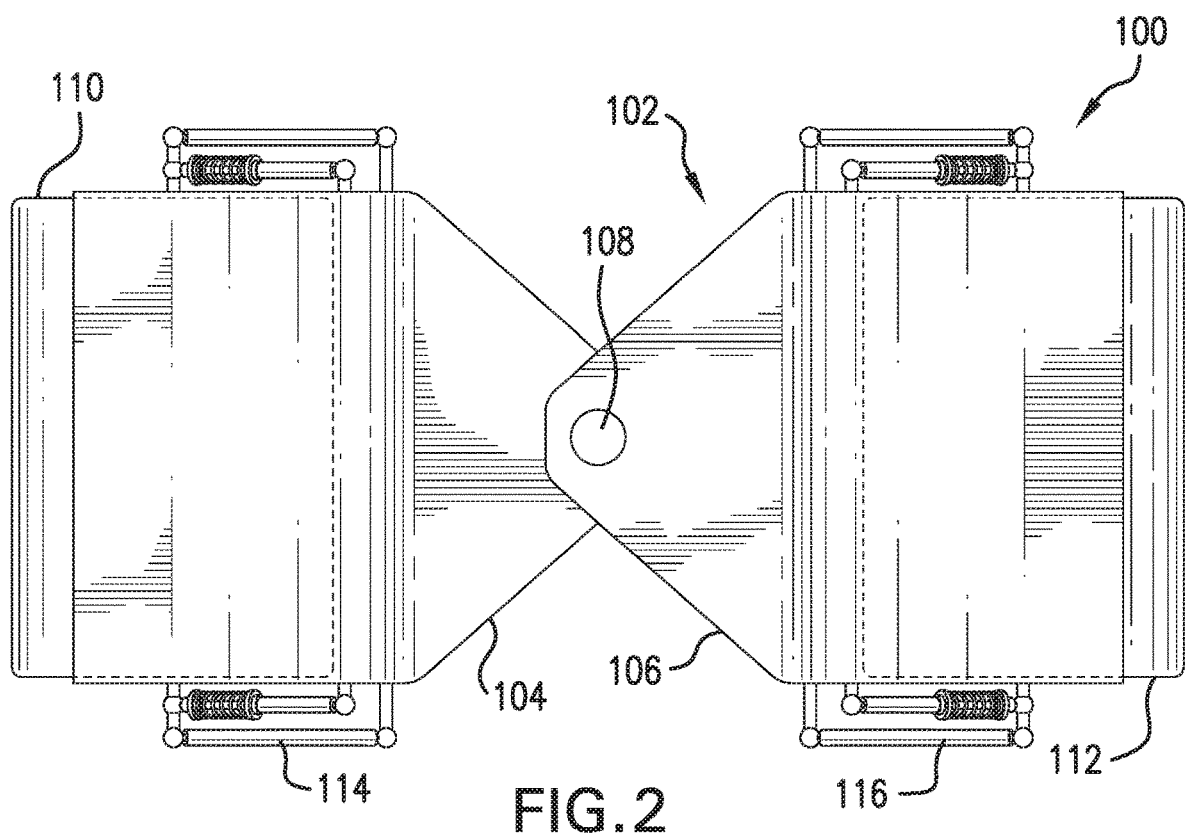
Figure 3:
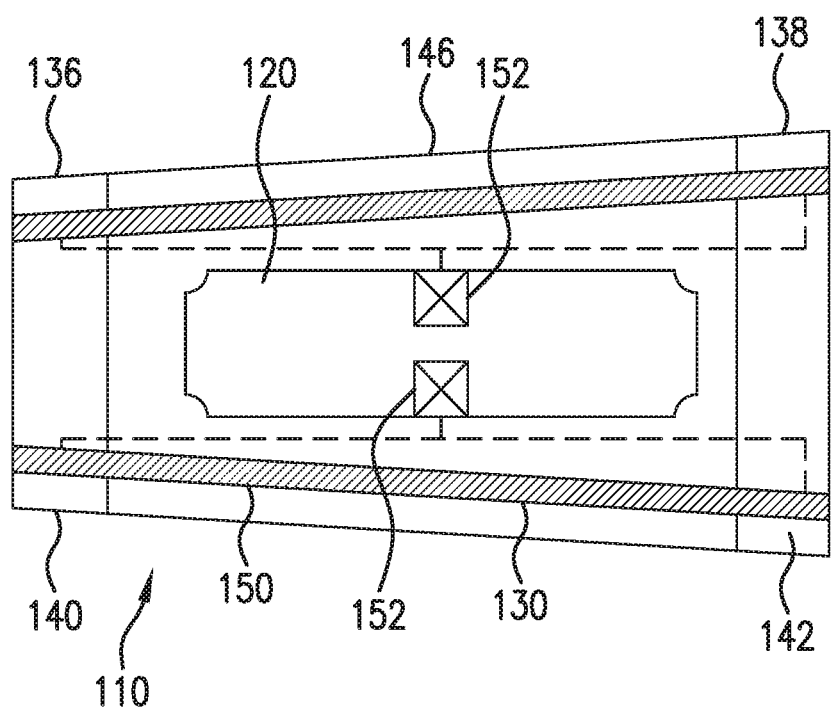
FIG. 3 is a schematic view of an expansion mandrel housed in one of a front wheel and rear wheel of the vehicle according to one aspect of the present disclosure.
Figure 6:
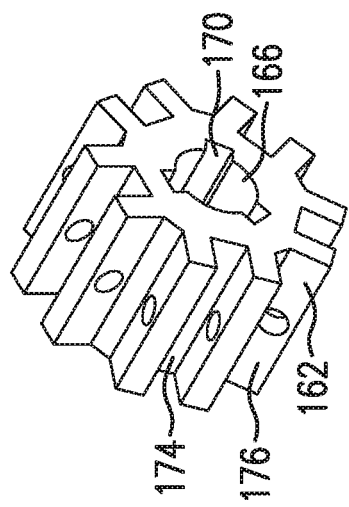
FIGS. 5-7 are component views for the expansion mandrel of FIG. 4.
Figure 7:
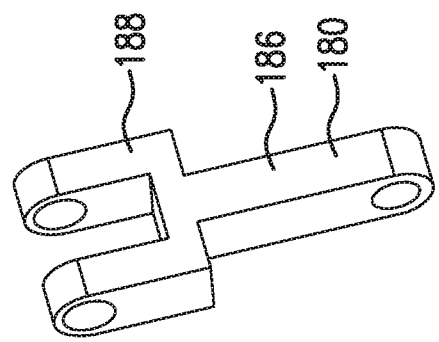
Figure 5:
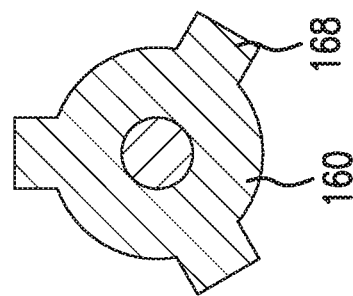
Figure 9:
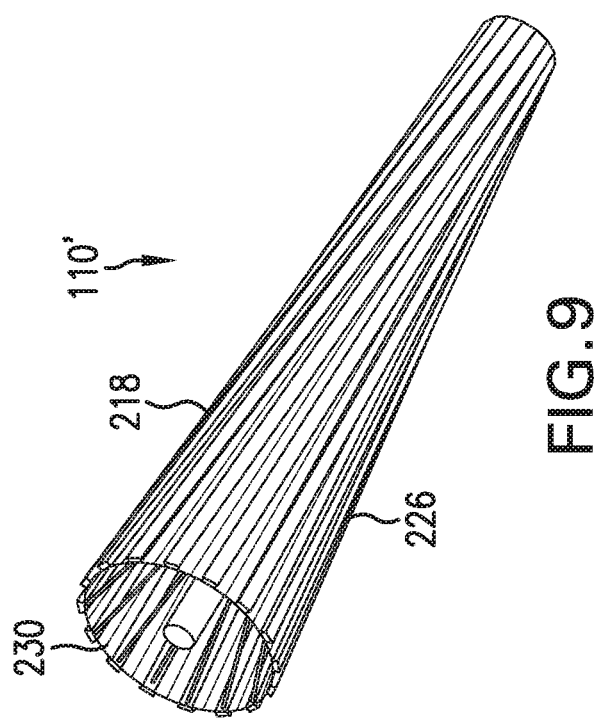
FIGS. 8-12 are views of an alternative configuration for one of the front wheel and rear wheel of the vehicle.
Figure 10:
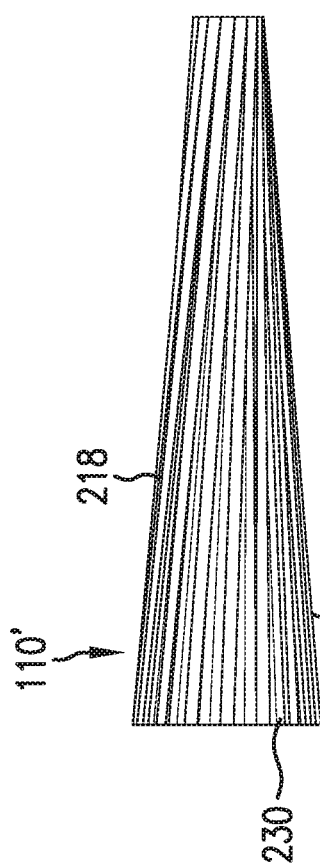
Figure 8:
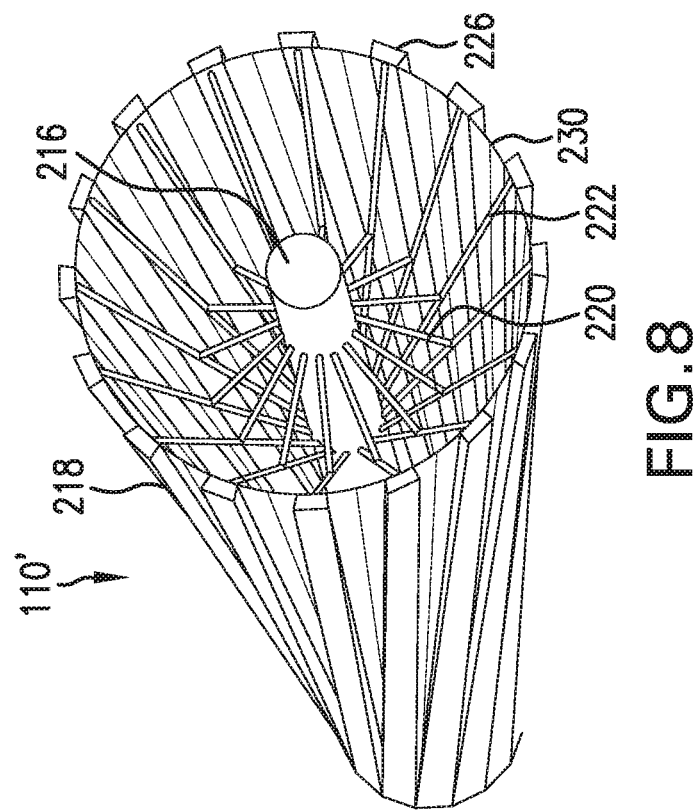
Figure 11:
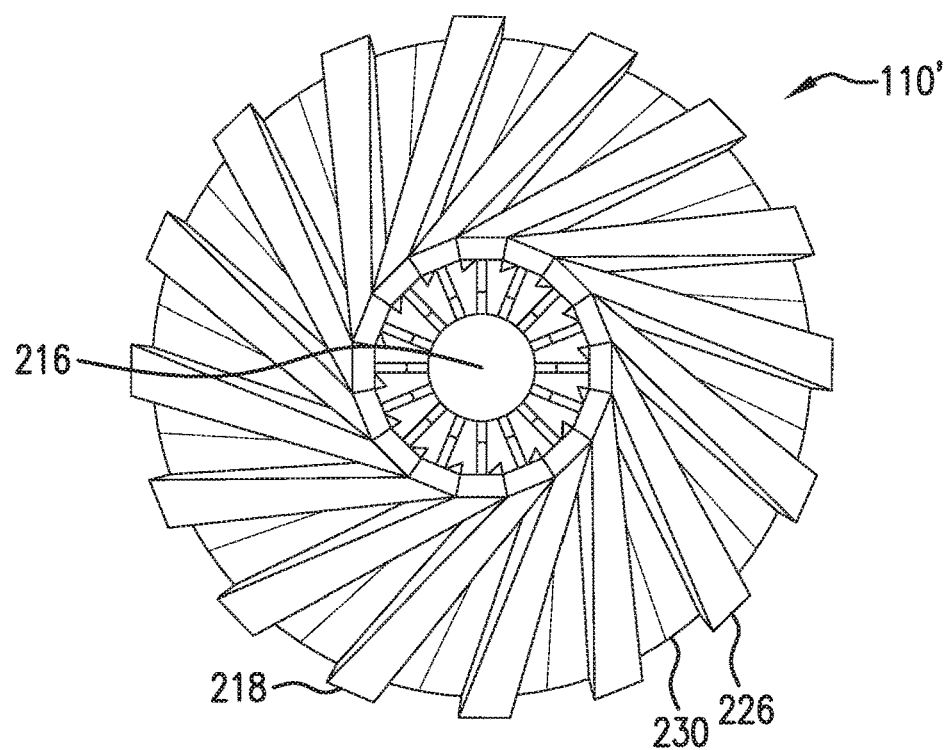
Figure 12:
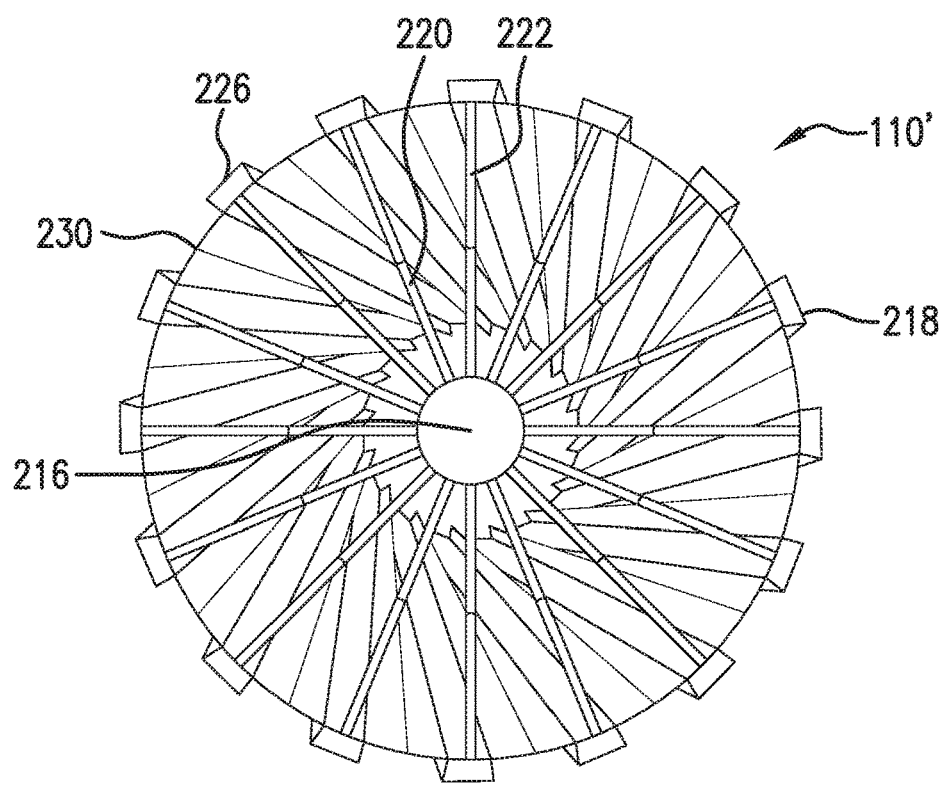

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 schematically illustrate a vehicle 100 according to one aspect of the present disclosure. The vehicle 100 generally comprises a frame 102 including a front frame part 104 and a rear frame part 106. In the depicted embodiment, the rear frame part 106 is separate from the front frame part 104 and is pivotably connected to the front frame part 104, for example, at a single pivot structure 108 (therefore, the front frame part 104 and the rear frame part 106 are connected at a single pivot point). A single front wheel 110 is rotatably connected to the front frame part 104, and a single rear wheel 112 is rotatably connected to the rear frame part 106. As will be described below, each of the front wheel 110 and the rear wheel 112 is adapted to have a cylindrical shape in top view when the vehicle 100 is traveling in a straight direction, and at least one of the front wheel 110 and the rear wheel 112 is adapted to expand and have a frustoconical shape in top view in a turning condition of the vehicle (see FIGS. 13 and 14 which depict an embodiment wherein each of the front wheel 110 and the rear wheel 112 is adapted to have a frustoconical shape in top view in a turning condition of the vehicle 100). Front and rear suspension devices 114, 116 suspend the respective front and rear wheels 110, 112 on the frame 102.

The vehicle 100 can further include a battery (not shown) and electrically connected to front and rear drive motors (only front drive motor 120 is shown) housed within the front and rear wheels 110, 112. It should be appreciated that the battery can be connected to an electric power control unit (not shown) which selectively distributes a driving force of the battery to the front and rear drive motors via a front and rear drive power lines/cables (not shown). Further, as is well known, a vehicle control device (not shown) can control the driving force distributed to the front wheel 110 and the rear wheel 112 by selectively connecting the electric power control unit to the front and rear drive power lines/cables, which, in turn, controls the front and rear drive motors.

FIG. 3 schematically depicts the front wheel 110 configured to house a front expansion device 130. The front expansion device 130 is adapted to selectively expand one of the opposite end portions 136, 138 of the front wheel 110 based on the turning direction of the vehicle. According to one embodiment, the front wheel 110 includes laterally spaced front expandable elements 140, 142, and the front expansion device 130 is configured to selectively expand one of the front expandable elements 140, 142. According to one aspect, the front expandable elements can be composed of highly elastic tire elements that are expandable via the front expansion device 130; although, alternative configurations for the front expandable elements are contemplated. The front tire 110 can include an outer skin 146 formed of an elastic polymeric material (for example, rubber) that interconnects the front expandable elements 140, 142. It should be appreciated that the rear wheel 112 can be similarly constructed to include expandable elements and rubber outer skin.

According to one embodiment, the front expansion device 130 is an expansion mandrel 150 adapted to selectively expand opposite end portions of the mandrel, and, in turn, the respective front expandable elements 140, 142. The expansion mandrel 150 is configured to expand and adjust a shape of the front tire 110 from a cylindrical shape in top view to a frustoconical shape in top view in a turning condition of the vehicle 100. According to the aspect depicted in FIG. 3, the expansion mandrel 150 can include at least one actuator 152, and a control circuit (not shown) that controls the at least one actuator 152 based on a command from the vehicle control device. As the control circuit of the expansion mandrel 150 controls driving of the at least one actuator 152 based on a command from the vehicle control device, the at least one actuator 152 is driven to expand one of the end portions of the expansion mandrel 150 (and, in turn, one of the front expandable elements 140, 142 of the front tire 110). It should be appreciated that a rear expansion device of the rear wheel 112 can be similarly constructed to include the expansion mandrel 150.

According to another aspect depicted in FIGS. 4-7, the expansion mandrel 150' for the front expansion device generally includes a linkage mechanism having an elongated rod or axle 160 configured and adapted to have mounted thereto sliders 162. The sliders provided nearest the end portions of the rod 160 will be referred to as the outer sliders, and the sliders located laterally inwardly of the outer sliders will be referred to as the inner sliders. In the depicted embodiment, each of the outer and inner sliders 162 are similarly constructed; although, this is not required. As shown, each of the outer and inner sliders 162 includes a central bore 166 shaped correspondingly to the rod 160, and the rod 160 is shaped in a manner to allow for sliding movement of the sliders 162 along a length of the rod 160 while preventing rotational movement of the sliders 162 about the rod 160. By way of example, the rod 160 can includes circumferentially spaced projections 168 extended a least a majority of the length of the rod 160, and the bore 166 can define channels 170 dimensioned to slidably receive the projections 168. Further, an outer surface 174 of each of the outer and inner sliders 162 includes spaced mounting tabs 176, which in the depicted embodiment extend parallel to the channels 170. With the mounting tabs 176, each of the outer and inner sliders 162 is gear shaped.

The outer and inner sliders 162 are interconnected by first and second links 180, 182 of the linkage mechanism. In the depicted aspect, each first link 180 is generally Y-shaped including a first section 186 for pivotal connection to at least one mounting tab 176 and a second section 188 for pivotal connection to the second link 182. As shown, the first section 186 is sized to be received between and pivotally connected to adjacent mounting tabs 176 of the outer slider 162. The second link 182 interconnects the second section 188 and the inner slider 162. As shown, one end section 194 of the second link 182 is sized to be received between and pivotally connected to adjacent mounting tabs 176 of the inner slider 162, a central section 196 of the second link 182 is pivotally connected to the second section 188 of the first link 180, and an opposite end section 198 is adapted to be connected to one of the front expandable elements 140, 142. At least one of the second links 182 has its end section 198 connected a support bar 210, which is adapted for connection within the front wheel 110. It should be appreciated that the support bar 210 is provided to limit movement of the inner sliders 162 along the rod 160.

With the first and second links 180, 182, it should be appreciated that the movement of the outer sliders relative to the inner sliders adjusts a shape of the front tire 110 from a cylindrical shape in top view to a frustoconical shape in top view in a turning condition of the vehicle 100. According to one aspect, movement of the outer sliders can be caused by the force dynamics associated with the vehicle 100 in a turning condition. According to another aspect, and similar to the expansion mandrel 150, the expansion mandrel 150' can include at least one actuator (not shown) operably connected to each outer slider 162, and a control circuit (not shown) that controls the at least one actuator based on a command from the vehicle control device. As the control circuit controls driving of the at least one actuator based on a command from the vehicle control device, the at least one actuator is driven to move one of the outer sliders to expand one of the front expandable elements 140, 142 of the front tire 110. It should be appreciated that a rear expansion device of the rear wheel 112 can be similarly constructed to include the expansion mandrel 150'.

FIGS. 8-12 depict an alternative configuration for a front tire 110' for the vehicle 100. The front tire 110' includes an axle 216 and an outer skin 218 connected to the axle 216 via a linkage mechanism having a plurality of first links 220 and second links 222. The outer skin 218 is defined by elongated separate slats 226, adjacent slats interconnected via a flexible webbing 230. The slats 226 can be composed of known tire elements. The webbing 230 can be configured as auxiliary lighting for the vehicle 100, and a control circuit (not shown) associated with the webbing 230 controls the illumination based on a command from the vehicle control device. By way of example, the webbing 230 can include flexible electroluminescent (EL) panels and/or flexible organic light-emitting diode (OLED) panels (manufactured by LG). According to one aspect, the webbing 230 can be illuminated to serve as headlights and/or tail lights for the vehicle 100. According to one aspect, the webbing 230 can be selectively illuminated based on predetermined driving conditions (for example, braking and turning). According to one aspect, the webbing 230 can also be configured as distress lighting, vehicle location indicators, as part of a vehicle alarm system, and can be customized for various visual effects as selected by the vehicle operator.

The first and second links 220, 222 are configured to adjust a shape of the front tire 110' from a cylindrical shape in top view to a frustoconical shape in top view in a turning condition of the vehicle 100. Each first link 220 is pivotally connected to the axle 216 and a central section of the second link 222. Each second link 222 includes one end section pivotally connected to the axle 216 at a location inward of each connected first link 220, and an opposite end section pivotally connected to one of the slats 226. Similar to the expansion mandrels described above, at least one actuator (not shown) can be operably connected to the first links 220, and a control circuit (not shown) can control the at least one actuator based on a command from the vehicle control device. As the control circuit controls driving of the at least one actuator based on a command from the vehicle control device, the at least one actuator is driven to move the first links 220, which, in turn, moves the second links 222 to expand the slats 226 of the front tire 110 during a turning condition of the vehicle 100.

Figure 13:
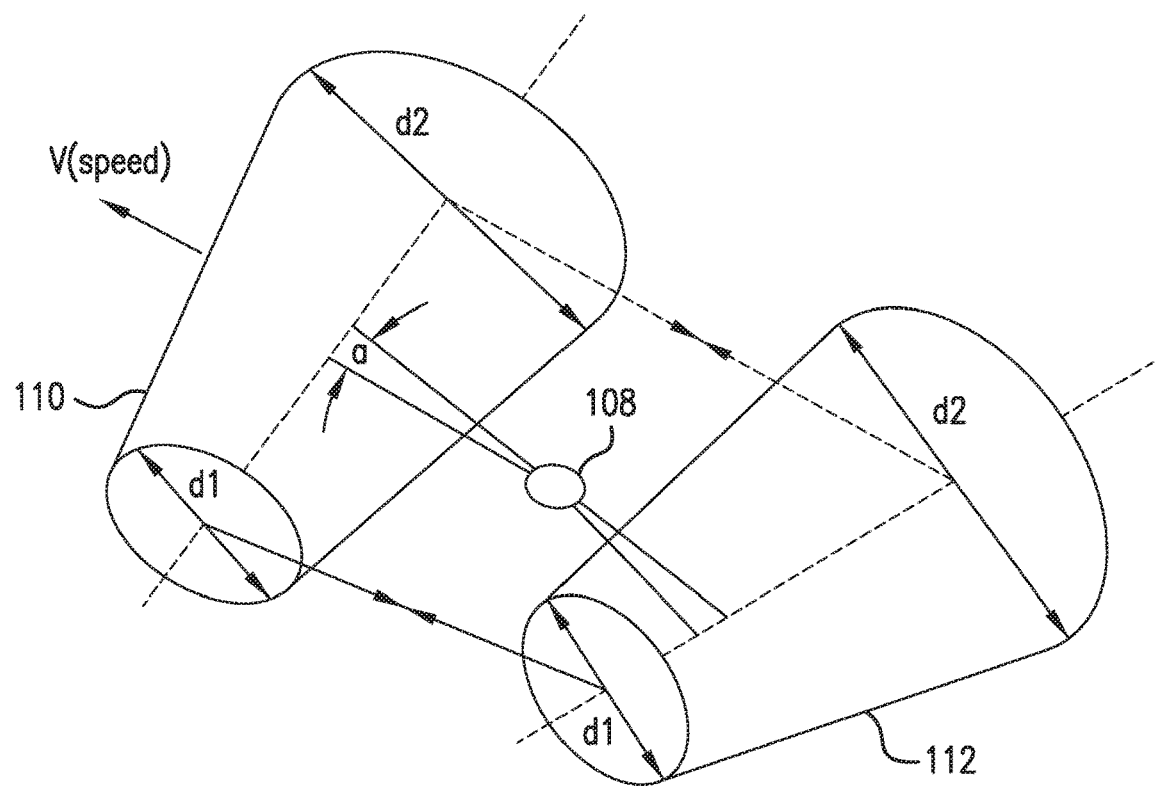
FIGS. 13 and 14 are schematic illustrations of the vehicle in a turning condition.
Figure 14:
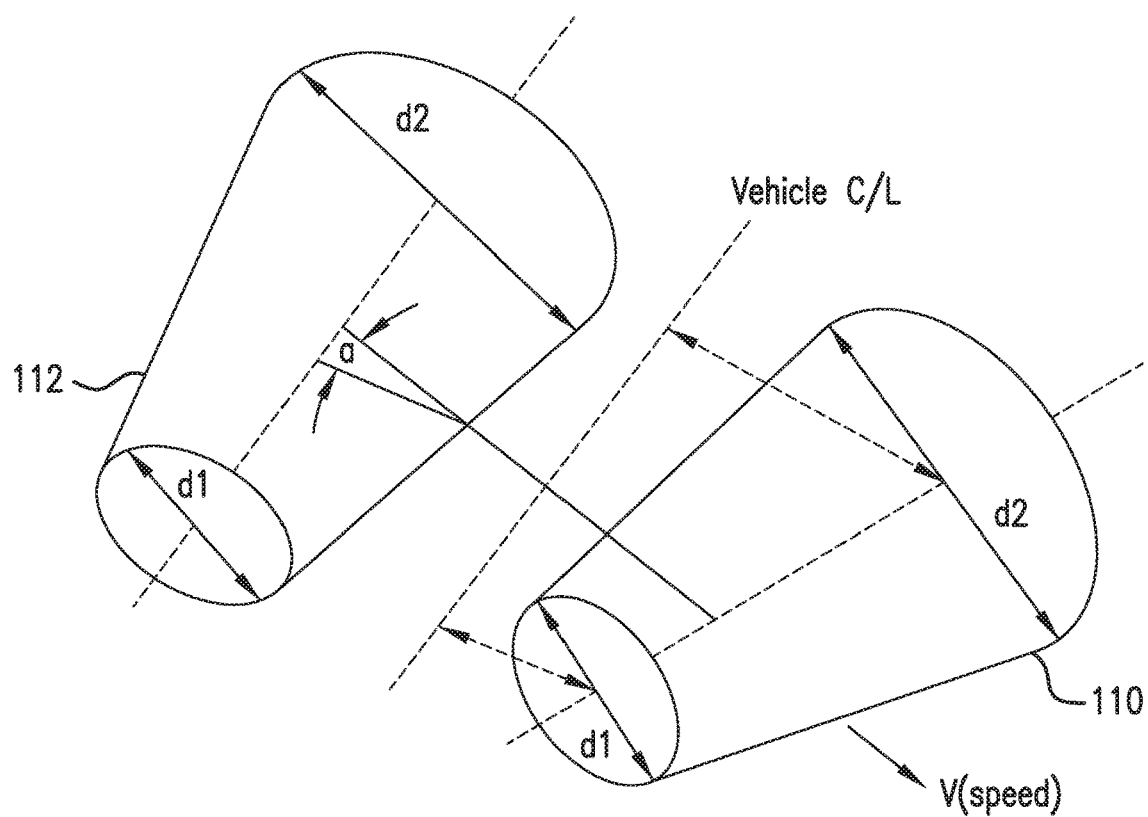

FIGS. 13 and 14 are schematic illustrations of the vehicle 100 in a turning condition wherein the front and rear wheels 110, 112 are linked together mechanically and electronically to provide a smooth and effective turning capability. The main directional change of the vehicle 100 is through changes in the front wheel end diameter shape and the rear wheel end diameter shape. In FIG. 13, the center pivot or front articulation design of the vehicle frame 102 facilitates vehicle turning (i.e., pivot angle). The front and rear frame parts 104, 106 (and, in turn, the front and rear wheels 110, 112) pivot in the center 108 of the vehicle frame 102 to accommodate for the change in the turning radius. In FIG. 14, the frame 102 is not a split frame (i.e., separate front and rear frame parts) like FIG. 13, and the changes in the front and rear wheel end diameter shape is relative to the vehicle center lines. According to each aspect, the tapered front and rear wheels 110, 112 allow a gentle banking feeling in a turning condition of the vehicle 100. In addition, the large traction surface of the front and rear wheels 110, 112 minimize wheel spin, and vehicle height can be lowered for easy access.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
a frame including a front frame part and a rear frame part;
an elongated single wheel rotatably connected to one of the front frame part and the rear frame part so as to constitute one of a single front wheel and a single rear wheel; and
wherein the elongated wheel includes opposite end portions, the elongated wheel houses an expansion device including a linkage mechanism adapted to selectively expand a diameter shape of one of the opposite end portions and reconfigure an overall shape of the elongated wheel between a cylindrical shape in a top view of the vehicle when the vehicle is traveling in a straight direction and a frustoconical shape in the top view of the vehicle in a turning condition of the vehicle, a directional change of the vehicle is through the expansion of the one end portion of the elongated wheel.

2. The vehicle according to claim 1, wherein the linkage mechanism includes:
an elongated axle that defines a rotational axis of the elongated wheel,
sliders slidably mounted to the axle, and
links interconnecting the sliders to the opposite end portions of the elongated wheel.

3. The vehicle according to claim 2, wherein each of the sliders includes a central bore shaped correspondingly to the axle, and the axle is shaped to allow for sliding movement of the sliders along a length of the axle while preventing rotational movement of the sliders about the axle.

4. The vehicle according to claim 3, wherein the axle includes circumferentially spaced projections extended a least a majority of the length of the axle, and the bore of each slider is further defined by channels dimensioned to slidably receive the projections.

5. The vehicle according to claim 2, wherein the sliders include first and second outer sliders provided at opposite end portions of the axle and first and second inner sliders located laterally inwardly of the respective first and second outer sliders, and the links interconnect the first and second outer sliders to the respective first and second inner sliders.

6. The vehicle according to claim 5, wherein the links are defined by first and second links, the first links interconnect the respective outer sliders with the second links, and the second links interconnect the respective inner sliders with the opposite end portions of the elongated wheel,
wherein movement of the first and second outer sliders relative to the respective first and second inner sliders adjusts a shape of the elongated wheel between cylindrical shape and frustoconical shape in the top view of the vehicle.

7. The vehicle according to claim 6, wherein an outer surface of each of the first and second outer sliders and the first and second inner sliders includes spaced mounting tabs for selective connection of the first and second links.

8. The vehicle according to claim 6, wherein the first links are pivotally connected to a central section of the second links.

9. The vehicle according to claim 6, wherein at least one of the second links pivotally connected to each of the first and second inner sliders is pivotally connected a support bar adapted for connection within the elongated wheel, the support bar provided to limit movement of the first and second inner sliders along the axle.

10. The vehicle according to claim 1, wherein elongated wheel includes an outer skin defined by elongated separate slats, adjacent slats interconnected via a flexible webbing, wherein the webbing is configured as auxiliary lighting for the vehicle.

11. The vehicle according to claim 10, wherein the webbing includes flexible electroluminescent panels and/or flexible organic light-emitting diode panels.

12. The vehicle according to claim 10, wherein the linkage mechanism includes an elongated axle that defines a rotational axis of the elongated wheel, and links interconnecting each of the slates to the axle.

13. The vehicle according to claim 12, wherein the links include first and second links, each first link is pivotally connected to the axle and each second link, and each second link is both pivotally connected to the axle at a location inward of each connected first link and to one of the slats.

14. A vehicle comprising:
a frame including a front frame part and a rear frame part;
a single front wheel rotatably connected to the front frame part; and
a single rear wheel rotatably connected to the rear frame part,
wherein each of the front wheel and the rear wheel is adapted to have a cylindrical shape in a top view when the vehicle is traveling in a straight direction, and at least one of the front wheel and the rear wheel houses an expansion device including a linkage mechanism adapted to reconfigure the at least one of the front wheel and the rear wheel to a frustoconical shape in the top view in a turning condition of the vehicle.

15. The vehicle of claim 14, wherein the front wheel includes opposite end portions, the front wheel is configured to house a front expansion device including a front linkage mechanism adapted to selectively expand one of the opposite end portions of the front wheel based on the turning direction of the vehicle, and
the rear wheel includes opposite end portions, the rear wheel is configured to house a rear expansion device including a rear linkage mechanism adapted to selectively expand one of the opposite end portions of the rear wheel based on the turning direction of the vehicle.

16. The vehicle according to claim 15, wherein each of the front and the rear linkage mechanism includes:
- an elongated axle that defines a rotational axis of the respect front and rear wheel,
- sliders slidably mounted to the axle, and
- links interconnecting the sliders to the opposite end portions of the respective front and rear wheels.

17. The vehicle according to claim 15, wherein at least one of the front and rear wheels includes an outer skin defined by elongated separate slats, adjacent slats interconnected via a flexible webbing, wherein the webbing is configured as auxiliary lighting for the vehicle.

18. The vehicle according to claim 17, wherein the links of the respective linkage mechanism of the one of the front and rear wheels interconnecting each of the slates to the axle.

19. A vehicle comprising:
- a frame including a front frame part and a rear frame part;
- a single front wheel rotatably connected to the front frame part; and
- a single rear wheel rotatably connected to the rear frame part,
- wherein each of the front wheel and the rear wheel is adapted to have a cylindrical shape in a top view when the vehicle is traveling in a straight direction, and is adapted to have a frustoconical shape in the top view in a turning condition of the vehicle,
- wherein the front wheel configured to house a front expansion device including a front linkage mechanism adapted to selectively expand one of opposite end portions of the front wheel based on the turning direction of the vehicle, and
- the rear wheel configured to house a rear expansion device including a rear linkage mechanism adapted to selectively expand one of opposite end portions of the rear wheel based on the turning direction of the vehicle,
- wherein each of the front and rear linkage mechanisms includes links interconnecting an axle to the respective opposite end portions of the front and rear wheels.

20. The vehicle according to claim 19, wherein at least one of the front and rear wheels includes an outer skin defined by elongated separate slats, adjacent slats interconnected via a flexible webbing, wherein the webbing is configured as auxiliary lighting for the vehicle.

* * * * *